US008443176B2

(12) United States Patent
Sonnelitter, III et al.

(10) Patent No.: US 8,443,176 B2
(45) Date of Patent: May 14, 2013

(54) METHOD, SYSTEM, AND COMPUTER PROGRAM PRODUCT FOR REDUCING CACHE MEMORY POLLUTION

(75) Inventors: Robert J. Sonnelitter, III, Wappingers Falls, NY (US); James J. Bonanno, Wappingers Falls, NY (US); David S. Hutton, Tallahasse, FL (US); Brian R. Prasky, Wappingers Falls, NY (US); Anthony Saporito, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 12/037,042

(22) Filed: Feb. 25, 2008

(65) Prior Publication Data

US 2009/0217003 A1 Aug. 27, 2009

(51) Int. Cl.
*G06F 9/00* (2006.01)
(52) U.S. Cl.
USPC ........................................................ 712/237
(58) Field of Classification Search .................. 712/207, 712/237
See application file for complete search history.

(56) References Cited

U.S. PATENT DOCUMENTS

| | | | | |
|---|---|---|---|---|
| 6,272,624 B1 * | 8/2001 | Giacalone et al. | ............ | 712/239 |
| 6,658,534 B1 * | 12/2003 | White et al. | ................. | 711/137 |
| 7,082,520 B2 | 7/2006 | Bonanno et al. | | |
| 7,085,916 B1 * | 8/2006 | Nguyen | ........................ | 712/207 |
| 7,107,437 B1 | 9/2006 | Padwekar | | |
| 7,185,178 B1 | 2/2007 | Barreh et al. | | |
| 7,197,630 B1 | 3/2007 | Alsup et al. | | |
| 7,441,110 B1 * | 10/2008 | Puzak et al. | ................... | 712/237 |
| 7,647,477 B2 * | 1/2010 | Caprioli et al. | ............... | 712/207 |
| 7,681,021 B2 * | 3/2010 | Schuler et al. | ................ | 712/238 |
| 2002/0194461 A1 | 12/2002 | Henry et al. | | |
| 2004/0030838 A1 | 2/2004 | van de Waerdt | | |
| 2006/0174090 A1 * | 8/2006 | Sartorius et al. | ............. | 712/207 |
| 2006/0224867 A1 | 10/2006 | Tran | | |
| 2007/0005938 A1 | 1/2007 | Grandou et al. | | |
| 2007/0130450 A1 * | 6/2007 | Chiao et al. | ................... | 712/239 |
| 2007/0143580 A1 | 6/2007 | Musoll et al. | | |

OTHER PUBLICATIONS

I-cheng K. Chen , Chih-chieh Lee , Trevor N. Mudge. "Instruction prefetching using branch prediction information" Int. Conf. Computer Design 97, Oct. 1997.*
P G Emma, A Hartstein, T R Puzak, V Srinivasan. "Exploring the limits of prefetching". IBM Journal of Research and Development. Armonk: Jan. 2005. vol. 49, Iss. 1; p. 127.*
International Business Machines Corporation (IBM), z/Architecture Principles of Operations, Sixth Edition (Apr. 2007), 1216 (split into 4 parts).

* cited by examiner

*Primary Examiner* — Jacob A Petranek
(74) *Attorney, Agent, or Firm* — Cantor Colburn LLP; John Campbell

(57) ABSTRACT

A method for reducing cache memory pollution including fetching an instruction stream from a cache line, preventing a fetching for the instruction stream from a sequential cache line, searching for a next predicted taken branch instruction, determining whether a length of the instruction stream extends beyond a length of the cache line based on the next predicted taken branch instruction, continuing preventing the fetching for the instruction stream from the sequential cache line if the length of the instruction stream does not extend beyond the length of the cache line, and allowing the fetching for the instruction stream from the sequential cache line if the length of the instruction stream extends beyond the length of the cache line, whereby the fetching from the sequential cache line and a resulting polluting of a cache memory that stores the instruction stream is minimized. A corresponding system and computer program product.

24 Claims, 4 Drawing Sheets

METHOD, SYSTEM, AND COMPUTER PROGRAM PRODUCT FOR REDUCING CACHE MEMORY POLLUTION

BACKGROUND OF THE INVENTION

This invention relates generally to computer processor operation, and more particularly to providing a method, system, and computer program product for reducing cache memory pollution.

In order to reduce or avoid the time delay (or "latency") of accessing data stored in the main memory of a computer, modern computer processors include a cache memory (or "cache") that stores recently accessed data so that it can be quickly accessed again by the processor. Data that is stored in a cache can be quickly accessed by a processor without the need to access the main memory (or "memory"), thereby increasing the performance of the processor and the computer overall. However, if the data needed by the processor does not exist (i.e., is not currently stored) in the cache, which is known as a "miss", then the processor is subject to the latency of accessing the memory for the needed data. A miss can also occur in cache memory designs that include a low level cache (e.g., an "L1 cache") and one or more higher level caches (e.g., an "L2 cache", "L3 cache", etc.) when the data needed by the processor does not exist in the L1 cache and the processor has to access a higher level cache, which also results in latency.

To reduce or avoid the latency of accessing data from the main memory or a higher level cache when there is a miss, data is often preloaded (or "prefetched") into the cache (or the L1 cache in the case of a multiple level cache) before it is needed by the processor. Thus, when the needed data is referenced by the processor, the resulting latency (or "miss penalty") is avoided if the data was prefetched or reduced if a prefetch of the data from the memory or a higher level cache is already in progress. However, prefetches of data are typically speculative, so it is not assured that prefetched data will be used by the processor. Since a cache memory (whether L1, L2, etc) is usually a fraction of the size of a main memory, a limited amount of data can be stored in the cache, and existing data is removed (or evicted) from the cache to provide space for newly prefetched data when the cache is full. Therefore, prefetched data that is not used by the processor can negatively affect performance by causing useful data to be evicted from the cache (or the L1 cache in a multi-level cache design), thereby requiring the processor to access the memory (or a higher level cache) to reference the useful data when it is needed. This eviction of useful data as a result of prefetching unneeded data is known as cache pollution, and it is desirable to reduce cache pollution.

BRIEF SUMMARY OF THE INVENTION

A method, system, and computer program product for reducing cache memory pollution is provided. An exemplary method embodiment includes fetching an instruction stream from a cache line, preventing a fetching for the instruction stream from a sequential cache line, searching for a next predicted taken branch instruction, determining whether a length of the instruction stream extends beyond a length of the cache line based on the next predicted taken branch instruction, continuing preventing the fetching for the instruction stream from the sequential cache line if the length of the instruction stream does not extend beyond the length of the cache line, and allowing the fetching for the instruction stream from the sequential cache line if the length of the instruction stream extends beyond the length of the cache line, whereby the fetching from the sequential cache line and a resulting polluting of a cache memory that stores the instruction stream is minimized.

An exemplary system embodiment includes an instruction fetch control configured to: fetch an instruction stream from a cache line, prevent a fetch for the instruction stream from a sequential cache line, determine whether a length of the instruction stream extends beyond a length of the cache line based on a next predicted taken branch instruction, continue preventing the fetch for the instruction stream from the sequential cache line if the length of the instruction stream does not extend beyond the length of the cache line, and allow the fetch for the instruction stream from the sequential cache line if the length of the instruction stream extends beyond the length of the cache line; and a branch prediction logic in communication with the instruction fetch control and configured to search for the next predicted taken branch instruction and communicate it to the instruction fetch control; whereby the fetch from the sequential cache line by the instruction fetch control and a resulting polluting of a cache memory that stores the instruction stream is minimized.

An exemplary computer program product embodiment includes a computer usable medium having a computer readable program, wherein the computer readable program, when executed on a computer, causes the computer to fetch an instruction stream from a cache line, prevent a fetch for the instruction stream from a sequential cache line, search for a next predicted taken branch instruction, determine whether a length of the instruction stream extends beyond a length of the cache line based on the next predicted taken branch instruction, continue preventing the fetch for the instruction stream from the sequential cache line if the length of the instruction stream does not extend beyond the length of the cache line, and allow the fetch for the instruction stream from the sequential cache line if the length of the instruction stream extends beyond the length of the cache line, whereby the fetch from the sequential cache line and a resulting polluting of a cache memory that stores the instruction stream is minimized.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Exemplary embodiments of the invention described herein provide a method, system, and computer program product for reducing cache memory pollution. In accordance with such exemplary embodiments, cache memory pollution, which results from the eviction of useful data from the cache when unneeded data is prefetched, is reduced. Furthermore, the resulting unnecessary usage of system resources to fetch unneeded data is reduced.

Figure 1:
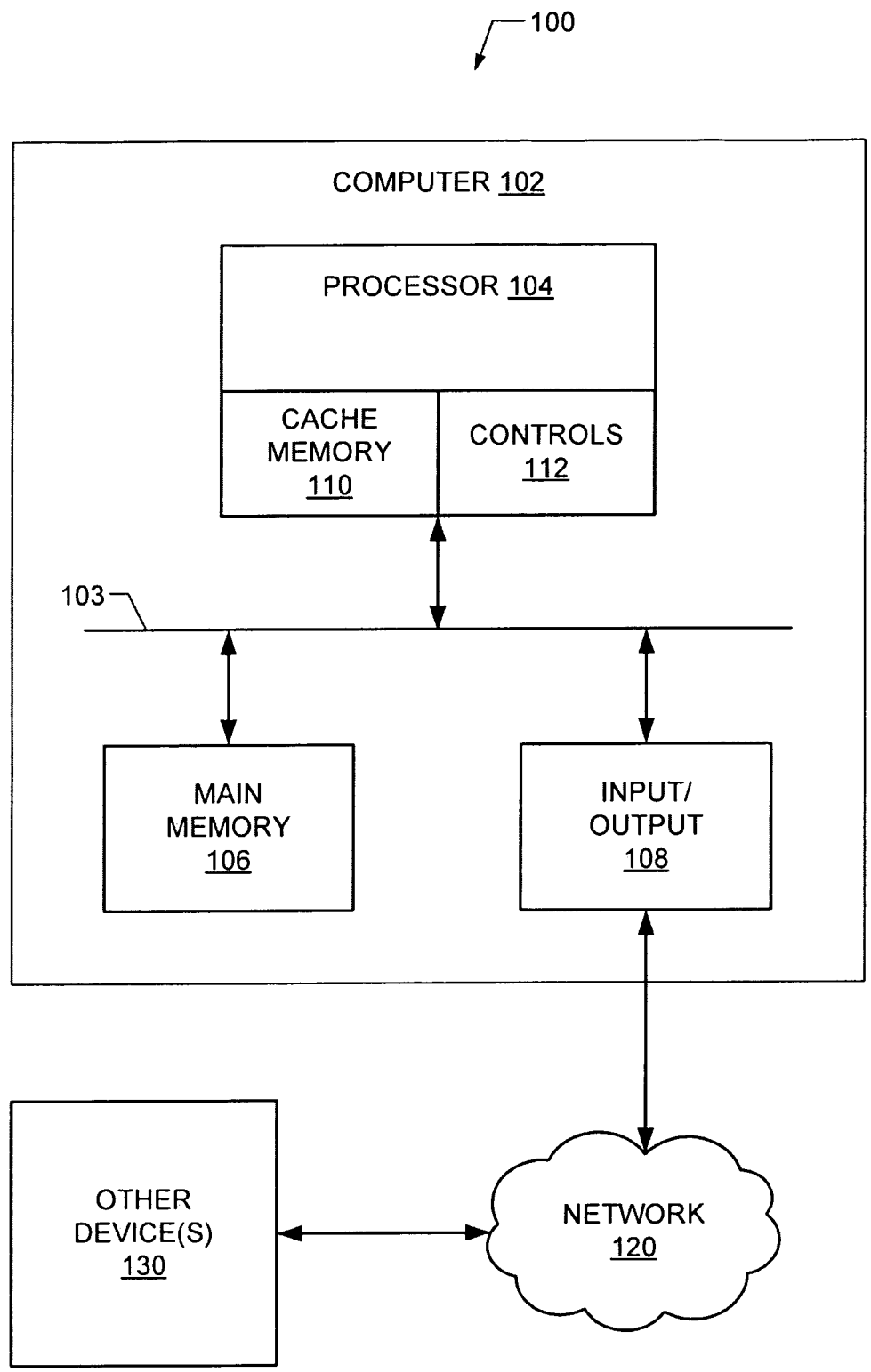
FIG. 1 is a block diagram illustrating an example of a computer system including an exemplary computing device configured for reducing cache memory pollution.

Turning now to the drawings in greater detail, wherein like reference numerals indicate like elements, FIG. 1 illustrates an example of a computer system 100 including an exemplary computing device ("computer") 102 configured for reducing cache memory pollution. In addition to computer 102, exemplary computer system 100 includes network 120 and other device(s) 130. Network 120 connects computer 102 and other device(s) 130 and may include one or more wide area networks (WANs) and/or local area networks (LANs) such as the Internet, intranet(s), and/or wireless communication network(s). Other device(s) 130 may include one or more other devices, e.g., one or more other computers, storage devices, peripheral devices, etc. Computer 102 and other device(s) 130 are in communication via network 120, e.g., to communicate data between them.

Exemplary computer 102 includes processor 104, main memory ("memory") 106, and input/output component(s) 108, which are in communication via bus 103. Processor 104 includes cache memory ("cache") 110 and controls 112, which include components configured for reducing cache memory pollution that will be described below. Cache 110 may include multiple cache levels (e.g., L1, L2, etc.) that are on or off-chip from processor 104 (e.g., an L1 cache may be on-chip, an L2 cache may be off-chip, etc.). Memory 106 may include various data stored therein, e.g., instructions, software, routines, etc., which, e.g., may be transferred to/from cache 110 by controls 112 for execution by processor 104. Input/output component(s) 108 may include one or more components that facilitate local and/or remote input/output operations to/from computer 102, such as a display, keyboard, modem, network adapter, etc. (not depicted).

Figure 2:
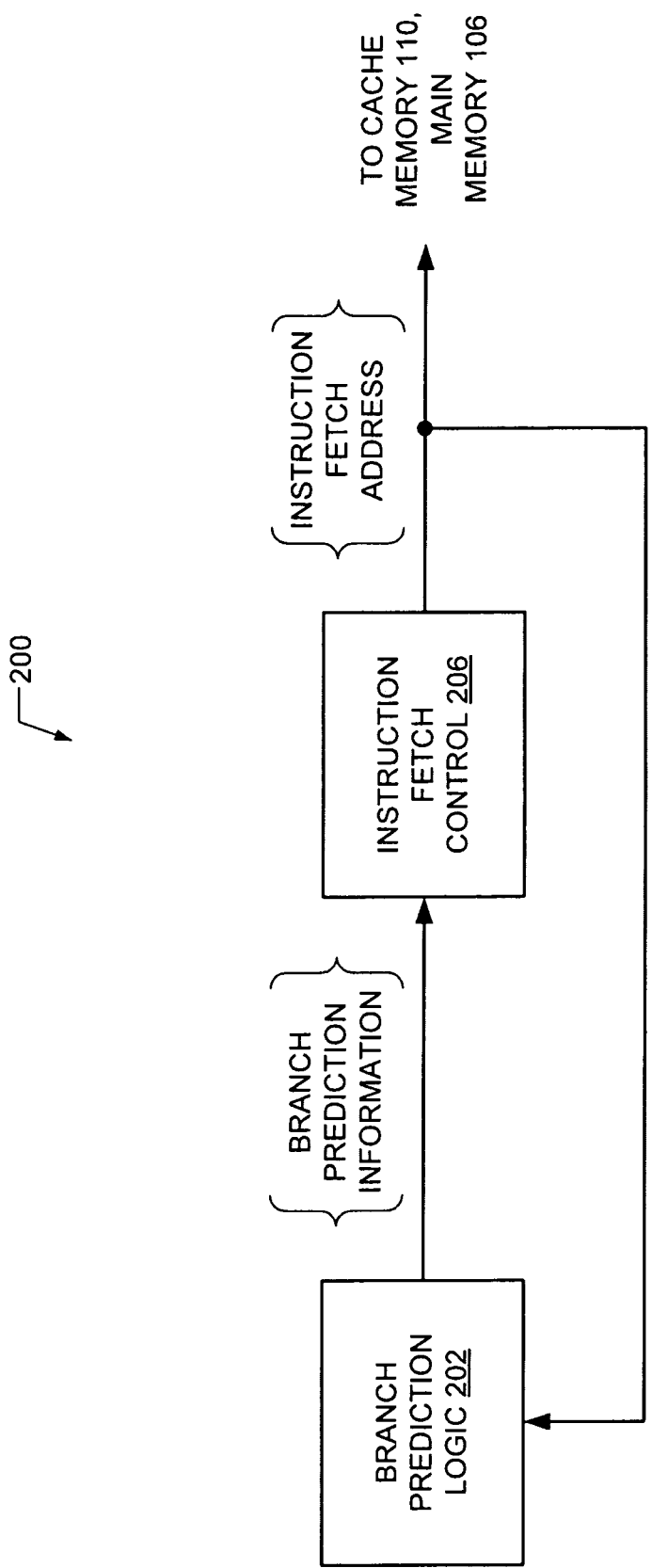
FIG. 2 is a block diagram illustrating an example of a processor subsystem of the exemplary computing device of FIG. 1 that is configured for reducing cache memory pollution.

FIG. 2 illustrates an example of a processor subsystem 200 of exemplary computer 102 that is configured for reducing cache memory pollution. Exemplary subsystem 200 may, e.g., be part of controls 112. Subsystem 200 includes branch prediction logic ("BPL") 202 and instruction fetch control ("IFC") 206, which are in communication, e.g., via one or more buses, circuits, connections, etc. IFC 206 receives one or more predicted target addresses, one or more predicted branch addresses, and, in some embodiments, additional branch prediction data (collectively, "branch prediction information") from BPL 202. IFC 206 uses a predicted target address as a reference point to begin fetching instructions and uses a predicted branch address as a reference point to stop fetching instructions. Based on the branch prediction information, IFC 206 sends one or more instruction fetch addresses to a cache memory (e.g., cache 110) or, if the instruction fetch is missed in the cache, to a main memory (e.g., memory 106). Alternately, in a multi-level cache design, IFC 206 may send one or more instruction fetch addresses to an above-L1 level of the cache if the instruction fetch is missed in the L1 cache or, if the instruction fetch is missed in the cache (e.g., including one or more above-L1 cache levels), to the main memory. BPL 202 also receives one or more of the instruction fetch addresses from IFC 206. BPL 202 uses one or more starting instruction fetch addresses (e.g., an address of a target instruction or "predicted target address") as a starting search address to search for predicted taken branch instructions (i.e., instructions executed based on a fulfilled condition—"predicted taken branches" or "predicted branches") when the execution of a program (e.g., software, routine, etc.) begins. BPL 202 also uses one or more predicted target addresses as a starting address for new searches for predicted branches.

In an exemplary operation of subsystem 200, when processor 104 begins executing a program, the starting instruction fetch address for the program is communicated to BPL 202 from IFC 206 to use as a starting search address. BPL 202 then searches for predicted branches. When a predicted branch is found, its address (i.e., predicted branch address) is communicated to IFC 206 from BPL 202, which uses the predicted branch address as a reference point to stop fetching instructions. A predicted target address is also communicated to IFC 206 from BPL 202, which is used as a reference point to start fetching instructions. BPL 202 also uses the predicted target address as the starting address for a new search for predicted branches. When IFC 206 receives the predicted target address to begin an instruction stream fetch, the length of the cache line is known (e.g., it is a preset parameter). However, it is not known whether the length of the instruction stream that begins at the predicted target address extends beyond the length of the cache line, e.g., into a sequential cache line.

To avoid issuing fetches to cache lines that will not be used, IFC 206 is configured to presume that the instruction stream is contained within a single cache line and, therefore, prevent fetches to one or more sequential cache lines, e.g., using a fetch blocking mechanism (e.g., sets a "fetch block"). IFC 206 then determines the length of the instruction stream with respect to the length of the cache line, e.g., based on the search for the second (or next) predicted branch by BPL 202. Examples of this determination will be discussed further below. If IFC 206 determines that the length of the instruction stream does not extend beyond the length of the cache line as presumed, IFC 206 continues to prevent fetches to one or more sequential cache lines (e.g., holds or maintains the fetch block). However, if IFC 206 determines that the length of the instruction stream extends beyond the length of the cache line, IFC 206 allows fetches to one or more sequential cache lines (e.g., by releasing the fetch block). In some embodiments, if BPL 202 does not find a second prediction branch within a (e.g., system dependent) functionally feasible amount of time, then IFC 206 allows fetches to one or more sequential cache lines (e.g., releases the fetch block), e.g., to avoid negatively impacting performance (e.g., of processor 104 and/or computer 102 in general).

Figure 3:
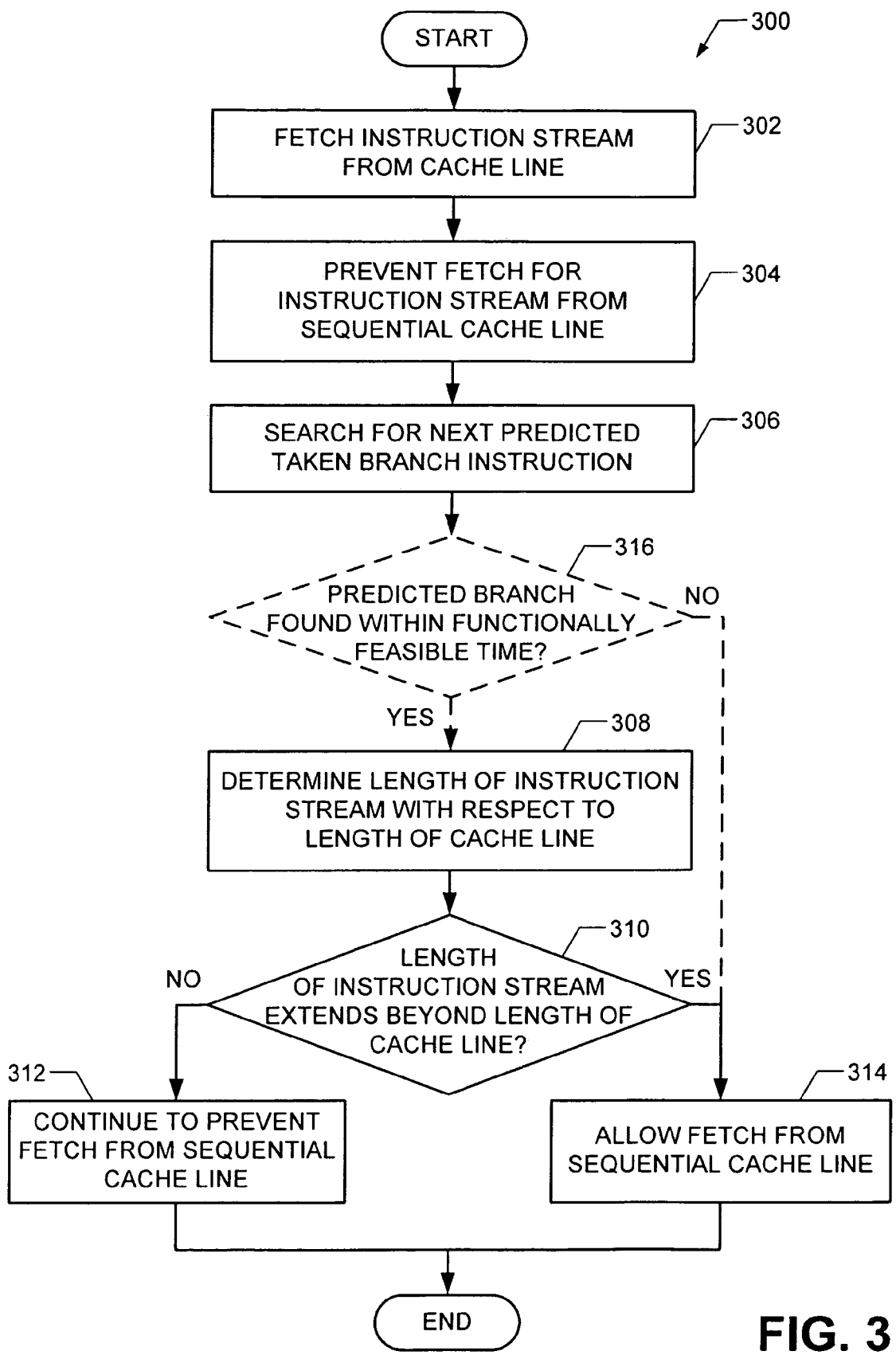
FIG. 3 is a flow diagram illustrating an example of a method for reducing cache memory pollution executable, for example, on the exemplary computing device of FIG. 1.

FIG. 3 is illustrates an example of a method 300 for reducing cache memory pollution executable, for example, on exemplary computer 102. In block 302, an instruction stream is fetched from a cache line (e.g., by IFC 206). For example, the instruction stream may be fetched from a cache memory 110 (including from one or more levels) or a main memory 106 of a computer 102. The instruction stream may start at a predicted target address, e.g., of a previous predicted branch or other pipeline restarting condition, such as a processor serialization event. In step 304, a fetch for the instruction stream from a sequential cache line is prevented (e.g., by IFC 206 setting a fetch block). In block 306, a search is conducted for a next predicted branch (e.g., by BPL 202).

In block 308, the length of the instruction stream is determined with respect to the length of the cache line (e.g., by IFC 206). In some embodiments, the length of the instruction stream may be determined based on the number bytes searched (e.g., by BPL 202) to find the next predicted branch, and this length is added to a cache line byte identifying portion (e.g., the least significant 8 bits of a 64-bit address) of the predicted target address (i.e., the start point byte of the instruction stream) to determine whether the instruction stream extends beyond the length of the cache line in which it starts. For example, if the length of the cache line is 256 bytes, the instruction stream starts at the 208th byte of the cache line, the BPL search length is 16 bytes, it takes four BPL searches to find the next predicted branch, and the predicted branch is found in the 12th byte of the fourth BPL search, then the length of the instruction stream is 208+[(16*3)+12]=268 bytes. Since the 268-byte relative length of the instruction stream is greater than the 256-byte length of the cache line, the instruction stream is determined to extend beyond the length of the cache line. If, based on the foregoing example, the next predicted branch is found in two BPL searches instead of four searches, then the length of the instruction stream is 208+[(16*1)+12]=236 bytes, and since the 236-byte relative length of the instruction stream is less than the 256-byte length of the cache line, the instruction stream is determined not to extend beyond the length of the cache line.

In other embodiments, the length of the instruction stream may be determined based on a comparison of the cache line address included within the predicted target address to the cache line address included within the next predicted branch address (i.e., the ending address of the instruction stream). For example, the cache line may be 256 bytes in length with each address of the cache line identified by a 64-bit address, where the most significant 56 bits of the address identify the cache line (i.e., in distinction from other cache lines in a cache or main memory) and the least significant 8 bits identify the start or end point byte of the instruction stream within the cache line (e.g., byte 0, 1, 2, . . . , or 255). If the 56-bit cache line identifying portion of the starting address of the instruction stream is different from the 56-bit cache line identifying portion of the ending address of the instruction stream, then the length of the instruction stream extends beyond the length of the cache line, e.g., into a sequential cache line. However, if the cache line identifying portion of the starting address of the instruction stream is the same as the cache line identifying portion of the ending address, then the length of the instruction stream does not extend beyond the length of the cache line. Other examples for the determination of the length of the instruction stream with respect to the length of the cache line are possible, which may be known or apparent in light of the disclosure herein.

In block 310, the condition of whether the length of the instruction stream extends beyond the length of the cache line (e.g., based on the determination in block 308) is determined (e.g., by IFC 206). If the length of the instruction stream does not extend beyond the length of the cache line, method 300 proceeds with block 312 in which the preventing of the fetch from the sequential cache line is continued (e.g., the fetch block is maintained by IFC 206). If the length of the instruction stream does extend beyond the length of the cache line, method 300 proceeds with block 314 in which fetches from the sequential cache line are allowed (e.g., the fetch block is released by IFC 206).

In some embodiments, the performance of blocks 308, 310, 312, and 314 is dependent on an additional block 316 in which the condition of whether a next predicted branch is found within a (e.g., system dependent) functionally feasible amount of time is determined (e.g., by IFC 206). If the next predicted branch is found within the functionally feasible amount of time, method 300 continues with blocks 308, 310, 312, and 314 as described above, wherein fetching from the sequential cache line is continued to be prevented or is allowed dependent on the length of the instruction stream in comparison to the length of the cache line. If the next predicted branch is not found within the functionally feasible amount of time, method 300 continues with block 314 as described above in which fetching from the sequential cache line is allowed.

Figure 4A:
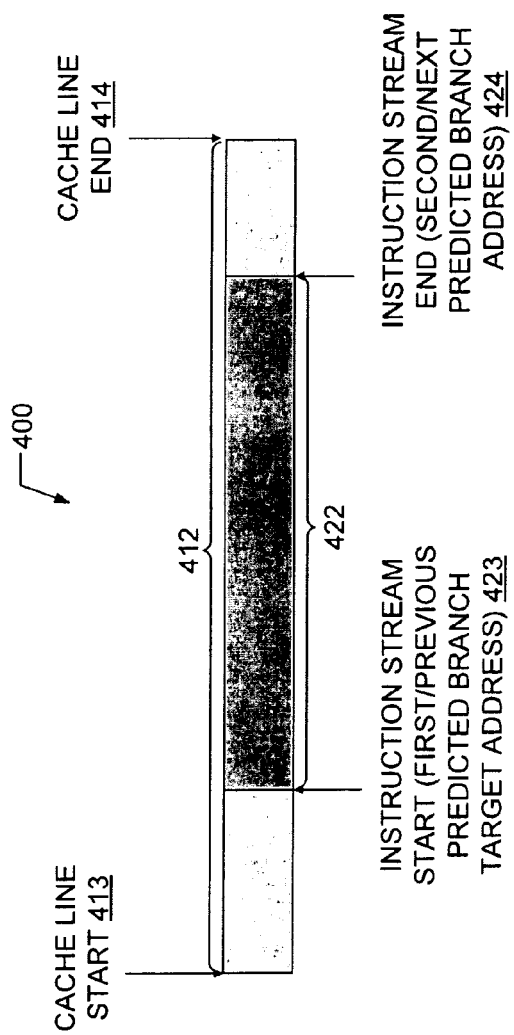
FIG. 4A is a block diagram illustrating an example of an instruction stream, fetched, for example, by the processor subsystem of FIG. 2, whose length does not extend beyond the length of a cache line in which it starts.

FIG. 4A is a block diagram illustrating an example 400 of an instruction stream 422, fetched, for example, by processor subsystem 200, whose length does not extend beyond the length of a cache line 412 in which it starts. Exemplary diagram 400 depicts cache line 412 with start point 413 and end point 414. Cache line 412 includes instruction stream 422 that starts at start point 423 within cache line 412 and ends at end point 424 also within cache line 412. Thus, the length of instruction stream 422 does not extend beyond the length of cache line 412.

Figure 4B:
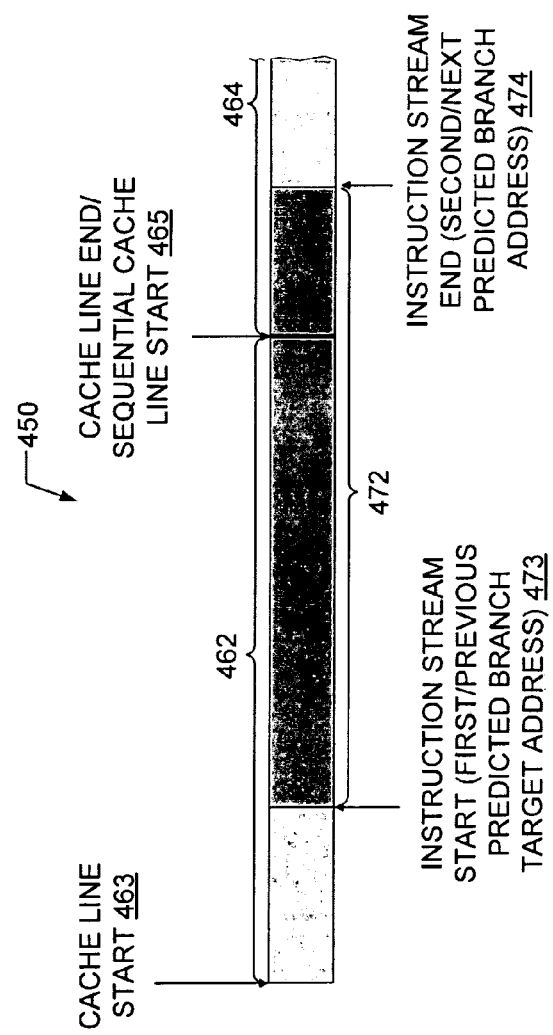
FIG. 4B is a block diagram illustrating an example of an instruction stream, fetched, for example, by the processor subsystem of FIG. 2, whose length extends beyond the length of a cache line in which it starts.

FIG. 4B is a block diagram illustrating an example 450 of an instruction stream 472, fetched, for example, by the processor subsystem 200, whose length extends beyond the length of a cache line 462 in which it starts. Exemplary diagram 450 depicts cache line 462 with start point 463 and boundary point 465 with sequential cache line 464. Boundary point 465, e.g., depicts a boundary between an end point of cache line 462 and a start point of cache line 464. Cache line 462 includes a portion of instruction stream 472 that starts at start point 473 within cache line 462 but ends at end point 474 within sequential cache line 464. Thus, the length of instruction stream 472 extends beyond the length of cache line 462 (i.e., into sequential cache line 464).

Elements of exemplary computer system 100, such as computer 102, are illustrated and described with respect to various components, modules, etc. for exemplary purposes. It should be understood that other variations, combinations, or integrations of such elements that provide the same features, functions, etc. are included within the scope of embodiments of the invention.

The flow diagram described herein is just an example. There may be many variations to this diagram or the blocks (or operations) thereof without departing from the spirit of embodiments of the invention. For instance, the blocks may be performed in a differing order, or blocks may be added, deleted or modified. All of these variations are considered a part of the claimed invention. Furthermore, although an exemplary execution of the flow diagram blocks is described with respect to elements of exemplary computer system 100 and exemplary subsystem 200, execution of the flow diagram blocks may be implemented with respect to other systems, subsystems, etc. that provide the same features, functions, etc. in accordance with exemplary embodiments of the invention.

As described above, embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a generalpurpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for reducing cache memory pollution, comprising:
    fetching an instruction stream from a current cache line;
    preventing a fetching for the instruction stream from a next sequential cache line until pre-fetching from the next sequential cache line is permitted;
    searching instructions to be pre-fetched from the instruction stream for a next predicted taken branch instruction;
    permitting fetching of the instruction stream from the next sequential cache line based on determining that the next predicted taken branch instruction is not in the current cache line;
    determining whether a length of the instruction stream extends beyond a length of the current cache line based on the next predicted taken branch instruction;
    continuing preventing the fetching for the instruction stream from the sequential cache line based on determining that the length of the instruction stream does not extend beyond the length of the current cache line, and continuing preventing the fetching for the instruction stream is dependent on determining if the length of the instruction stream extends beyond the length of the current cache line within an amount of time;
    allowing the fetching for the instruction stream from the next sequential cache line based on determining that the length of the instruction stream extends beyond the length of the current cache line and
    comprising allowing the fetching for the instruction stream from the next sequential cache line after the amount of time.

2. The method of claim 1, wherein the instruction stream starts at an address of a target instruction; and
    determining whether the length of the instruction stream extends beyond the length of the current cache line comprises comparing the length of the instruction stream to the length of the current cache line, wherein the length of the instruction stream comprises a cache line byte identifying portion of the address of the target instruction added to a number of bytes searched to find the next predicted taken branch instruction.

3. The method of claim 1, wherein the instruction stream starts at an address of a target instruction; and
    determining whether the length of the instruction stream extends beyond the length of the current cache line comprises comparing a cache line identifying portion of the address of the target instruction to a cache line identifying portion of the address of the next predicted taken branch instruction.

4. The method of claim 1, wherein preventing a fetching comprises setting a fetch block;
    continuing preventing the fetching comprises maintaining the fetch block; and
    allowing the fetching comprises releasing the fetch block.

5. The method of claim 1, wherein determining whether the length of the instruction stream extends beyond the length of the current cache line is dependent on determining the length of the instruction stream without negatively impacting performance; and
    allowing the fetching for the instruction stream from the next sequential cache line after the amount of time is to prevent negatively impacting performance.

6. The method of claim 1, wherein fetching an instruction stream comprises fetching the instruction stream from the cache memory or a main memory.

7. A system for reducing cache memory pollution, comprising:
    an instruction fetch control configured to:
        fetch an instruction stream from a current cache line;
        prevent a fetch for the instruction stream from a next sequential cache line until pre-fetching from the next sequential cache line is permitted;
        determine whether a length of the instruction stream extends beyond a length of the current cache line based on a next predicted taken branch instruction;
        continue preventing the fetch for the instruction stream from the sequential cache line based on determining that the length of the instruction stream does not extend beyond the length of the cache line, and continue preventing the fetch for the instruction stream is dependent on determining if the length of the instruction stream extends beyond the length of the current cache line within an amount of time;
    allow the fetch for the instruction stream from the next sequential cache line based on determining that the length of the instruction stream extends beyond the length of the cache line;
    a branch prediction logic in communication with the instruction fetch control and configured to search instructions to be pre-fetched from the instruction stream for the next predicted taken branch instruction and based on determining that the next predicted taken branch instruction is not in the current cache line, permitting fetching of the instruction stream from the next sequential cache line and communicate it to the instruction fetch control; and
    allow the fetch for the instruction stream from the next sequential cache line after the amount of time.

8. The system of claim 7, wherein:
    the branch prediction logic is further configured to communicate an address of a target instruction to the instruction fetch control to identify the start of the instruction stream; and
    the instruction fetch control is configured to determine whether the length of the instruction stream extends beyond the length of the current cache line by comparing the length of the instruction stream to the length of the current cache line, wherein the length of the instruction stream comprises a cache line byte identifying portion of the address of the target instruction added to a number of bytes searched to find the next predicted taken branch instruction.

9. The system of claim 7, wherein:
the branch prediction logic is further configured to communicate an address of a target instruction to the instruction fetch control to identify the start of the instruction stream; and
the instruction fetch control is configured to determine whether the length of the instruction stream extends beyond the length of the current cache line comprises comparing a cache line identifying portion of the address of the target instruction to a cache line identifying portion of the address of the next predicted taken branch instruction.

10. The system of claim 7, wherein the instruction fetch control is configured to:
prevent a fetch by setting a fetch block;
continue preventing the fetch by maintaining the fetch block; and
allowing the fetch by releasing the fetch block.

11. The system of claim 7, wherein the instruction fetch control is further configured to:
determine whether the length of the instruction stream extends beyond the length of the current cache line is dependent on determining the length of the instruction stream without negatively impacting performance;
allow the fetch for the instruction stream from the next sequential cache line after the amount of time is to prevent negatively impacting performance.

12. The system of claim 7, wherein the instruction fetch control is configured to fetch the instruction stream from the cache memory or a main memory.

13. A computer program product for reducing cache memory pollution, comprising a non-transitory computer usable storage medium having a computer readable program, wherein the computer readable program, when executed on a computer, causes the computer to:
fetch an instruction stream from a current cache line;
prevent a fetch for the instruction stream from a next sequential cache line until pre-fetching from the next sequential cache line is permitted;
search instructions to be pre-fetched from the instruction stream for a next predicted taken branch instruction;
permitting fetching of the instruction stream from the next sequential cache line based on determining that the next predicted taken branch instruction is not in the current cache line
determining whether a length of the instruction stream extends beyond a length of the current cache line based on the next predicted taken branch instruction;
continue preventing the fetch for the instruction stream from the sequential cache line based on determining that the length of the instruction stream does not extends beyond the length of the cache line and continue preventing the fetch for the instruction stream dependent on determining if the length of the instruction stream extends beyond the length of the current cache line within an amount of time;
allow the fetch for the instruction stream from the next sequential cache line based on determining that the length of the instruction stream extends beyond the length of the cache line; and
allow the fetch for the instruction stream from the next sequential cache line after the amount of time.

14. The computer program product of claim 13, wherein the computer readable program, when executed on the computer, causes the computer to:
fetch the instruction stream starting at an address of a target instruction; and
determine whether the length of the instruction stream extends beyond the length of the current cache line by comparing the length of the instruction stream to the length of the current cache line, wherein the length of the instruction stream comprises a cache line byte identifying portion of the address of the target instruction added to a number of bytes searched to find the next predicted taken branch instruction.

15. The computer program product of claim 13, wherein the computer readable program, when executed on the computer, causes the computer to:
fetch the instruction stream starting at an address of a target instruction; and
determine whether the length of the instruction stream extends beyond the length of the current cache line comprises comparing a cache line identifying portion of the address of the target instruction to a cache line identifying portion for the address of the next predicted taken branch instruction.

16. The computer program product of claim 13, wherein the computer readable program, when executed on the computer, causes the computer to:
prevent a fetch by setting a fetch block;
continue preventing the fetch by maintaining the fetch block; and
allowing the fetch by releasing the fetch block.

17. The computer program product of claim 13, wherein the computer readable program, when executed on the computer, causes the computer to determine whether the length of the instruction stream extends beyond the length of the current cache line is dependent on determining the length of the instruction stream without negatively impacting performance; and
allows the fetch for the instruction stream from the next sequential cache line after the amount of time is to prevent negatively impacting performance.

18. The computer program product of claim 13, wherein the computer readable program, when executed on the computer, causes the computer to fetch the instruction stream from the cache memory or a main memory.

19. The method of claim 1, comprising continuing preventing the fetching for the instruction stream from the sequential cache line based on a second prediction branch being found within a time threshold.

20. The method of claim 1, comprising allowing the fetching for the instruction stream from the next sequential cache line based on determining a second prediction branch is found within a time threshold.

21. The system of claim 7, wherein continuing preventing the fetch for the instruction stream from the sequential cache line is based on a second prediction branch being found within a time threshold.

22. The system of claim 7, wherein allowing the fetch for the instruction stream from the next sequential cache line is based on a second prediction branch being found within a time threshold.

23. The computer program product of claim 13, wherein continuing preventing the fetch for the instruction stream from the sequential cache line is based on a second prediction branch being found within a time threshold.

24. The computer program product of claim 13, wherein allowing the fetch for the instruction stream from the next sequential cache line is based on a second prediction branch being found within a time threshold.

* * * * *